United States Patent Office 2,901,462
Patented Aug. 25, 1959

2,901,462

PROCESS FOR THE MANUFACTURE OF EPOXY RESINS

John Anderson, San Pedro, and Donald S. Melstrom, Torrance, Calif., assignors to Shell Development Company, New York, N.Y., a corporation of Delaware No Drawing. Application November 30, 1956
Serial No. 625,222

4 Claims. (Cl. 260—47)

This invention relates to a process for manufacturing epoxy resins. More particularly, the invention relates to a new process for preparing compositions containing glycidyl ethers of polyhydric phenols which have low viscosities.

Specifically, the invention provides a new and highly efficient process for preparing compositions containing glycidyl ethers of polyhydric phenols which have low viscosities but can be cured to form products having properties equal to or superior to those prepared from related compositions having much higher viscosities. This new process comprises reacting a polyhydric phenol with more than an equivalent amount of an epihalohydrin and an alkali metal hydroxide in the presence of from 0.1% to 13% by weight of a monohydric phenol.

Glycidyl ethers of polyhydric phenols have been prepared heretofore by etherifying a polyhydric phenol with epichlorohydrin in conjunction with sodium hydroxide to effect the reaction. The liquid products prepared by this method, however, have rather high viscosities and in order to be useful for certain applications, such as in adhesives, laminates, surface coatings and the like, it has been necessary to add liquid diluents. The addition of such diluents has not been satisfactory in many cases as their presence tends to have a deleterious effect on the properties of the cured product.

It is an object of the invention to provide an improved process for preparing epoxy resins. It is a further object to provide a new process for preparing liquid compositions containing glycidyl ethers of polyhydric phenols which have low viscosities. It is a further object to provide a method for making liquid compositions containing glycidyl ethers of polyhydric phenols which can be used in applications, such as adhesives, laminates and the like, without the addition of diluents. It is a further object to provide a process for preparing liquid compositions containing glycidyl ethers of polyhydric phenols having low viscosities that can be cured to form products which are equal to or superior to those prepared from compositions having much higher viscosities. These and other objects of the invention will be apparent from the following detailed description thereof.

It has now been discovered that these and other objects may be accomplished by the process of the invention comprising reacting a polyhydric phenol with more than an equivalent amount of an epihalohydrin and an alkali metal hydroxide in the presence of from 0.1% to 13% by weight of a monohydric phenol. It has been found that by using this special process wherein a monohydric phenol is present in certain amounts in the reaction mixture during the formation of the epoxy resins that one can obtain liquid compositions containing the glycidyl polyethers of the polyhydric phenols having surprisingly low viscosities. Thus, regular liquid grade glycidyl polyether prepared from 2,2-bis(4-hydroxyphenyl)propane has a viscosity of about 140–160 while the liquid composition prepared from 2,2-bis(4-hydroxyphenyl)propane by the process of the present invention has a viscosity as low as 27. Furthermore, the low viscosity products prepared by the present invention may be cured to form insoluble infusible products which are at least equal and in many cases superior to those prepared from the high viscosity products. As noted above, this was unexpected in view of the fact that previous attempts to reduce the viscosity of the glycidyl polyethers has always resulted in the formation of cured products having poor properties. Evidence of the improved properties of the products obtained by curing the compositions prepared by the process of the invention may be found in the working examples at the end of the specification.

The monohydric phenols to be utilized in the process of the invention are the aromatic compounds possessing a single OH group attached directly to the aromatic ring. The compounds may be mono- or polynuclear and may be substituted with other substituents, such as hydrocarbon radicals, such as, for example, alkyl, alkenyl and cycloalkyl and cycloalkenyl radicals, halogen atoms, such as chlorine and bromine, ether and ester radicals and the like. Examples of the monohydric phenols include, among others, phenol, 3-vinylphenol, p-tertiary-butyl-phenol, p-tertiary-octylphenol, 3,5-dimethylphenol, 3,5-dibromo-4-alkylphenol, 3-allylphenol, 3,5-dimethoxyphenol, 3-allyloxyphenol, 2-cyclohexenylphenol, m-(8-pentadecenyl)phenol, 2,4-diallylphenol 2,4,6-triallylphenol, p-chlorophenol, p-isooctylphenol and the like. Especially preferred are the unsubstituted monohydric phenols and the alkyl and alkenyl substituted monohydric phenols and chloro-substituted monohydric phenols all of which contain less than 18 carbon atoms, and preferably less than 12 carbon atoms.

The above-described monohydric phenols are added to the reaction mixture only in certain minor amounts. The monohydric phenols are added in amounts varying from 0.1% to 13% by weight and preferably in amounts of from 3% to 10% by weight (based on the weight of the polyhydric phenol).

In the operation of the process of the invention, one or more of the above-described monohydric phenols are added to the reaction mixture containing the polyhydric phenol, epihalohydrin or dichlorohydrin and alkali metal hydroxide.

The process of the invention is applicable for efficient production of glycidyl ether of any suitable polyhydric phenols. Typical phenols include resorcinol, hydroquinone, methyl resorcinol, chlorohydroquinone, phloroglucinol, 1,5-dihydroxynaphthalene, 4,4'-dihydroxydiphenyl, bis(4-hydroxyphenyl)methane, 1,1-bis(4-hydroxyphenyl)ethane, 1,1-bis(4-hydroxyphenyl)-isobutane, 2,2-bis(4-hydroxyphenyl)propane which is termed bis-phenol hereinafter for convenience, 2,2-bis(4-hydroxyphenyl)-butane, 2,2-bis(4-hydroxy-2-methyl)propane, 2,4'-dihydroxydiphenyldimethylmethane, 2,2-bis(2-chloro-4-hydroxyphenyl)propane, 2,2-bis(2-hydroxynaphthyl)pentane, 1,3-bis(4-hydroxyphenyloxy)-2-hydroxypropane, 3-hydroxyphenyl salicylate, as well as more complex polyhydric phenols such as novolac resins obtainable by acid catalyzed condensation of phenol, p-cresol or other substituted phenols with aldehydes such as formaldehyde, acetaldehyde, crotonaldehyde, etc.; condensates of phenols with cardanol such as described in U.S. Patent No. 2,317,-607; condensates of phenols with aliphatic diols such as described in U.S. No. 2,321,620; and condensates of phenols with unsaturated fatty oils such as described in U.S. No. 2,031,586. The polyhydric phenols contain 2 or more phenolic hydroxyl groups in the average molecule thereof and are free of other functional groups which would interfere with formation of the desired glycidyl ethers. Particularly preferred are those containing from 6 to 30 carbon atoms and more preferably from 6 to 20 carbon atoms.

Although it is preferred to use epichlorohydrin, other epihalohydrins, such as epibromohydrin, may also be used if desired. Sodium hydroxide is normally preferred as the alkali although other alkali metal hydroxides, such as potassium hydroxide may also be employed.

As to proportions, more than an equivalent of the epihalohydrin is to be used. Thus, when a dihydric phenol is etherified according to the process, more than 1 mole of epihalohydrin per mole of the phenol is used. The value of the process of the invention is more apparent when the glycidyl polyethers are of the liquid type and in order to obtain this type of product one should preferably use a substantial excess of the epihalohydrin. This includes, for example, ratios of say 2 to 25 moles of the epihalohydrin per mol of dihydric phenol. Best results in preparing the liquid resins by using a ratio of 5 to 15 moles, and still more preferably from 5 to 10 moles of the epihalohydrin per mole of dihydric phenol.

The amount of hydroxide used in the process is largely governed by the amount of epihalohydrin that reacts. Thus, in etherifying a polyhydric phenol with use of an excess of more than two moles of epihalohydrin per phenolic hydroxyl equivalent weight of the phenol, there is used about a mole of the hydroxide per phenolic hydroxyl equivalent weight of the phenol. For example, preparation of glycidyl ether of a dihydric phenol with use of the excess of epihalohydrin is normally effected with use of about 1.8 to 2.5 moles, preferably about 2.1 to 2.3 moles, of the hydroxide per mole of the dihydric phenol.

The alkali metal hydroxide may be brought together with the other reactants in any suitable manner. While solid hydroxide may be used it is usually preferred to employ an aqueous solution such as one containing about 5% to 30% by weight of the hydroxide. Good results are obtained using about 10% to 20% by weight concentration of aqueous hydroxide solution. If desired, a solution or suspension of the hydroxide may also be used.

Although various procedures may be employed in bringing the reactants together, it is generally preferred to add the polyhydric phenol and monohydric phenol to the aqueous solution containing the alkali metal hydroxide, warm the mixture and then add the epihalohydrin to the mixture.

Temperatures used in the etherification reaction generally vary between about 40° C. to about 150° C. and more preferably between 60° C. to 100° C. It is usually desirable to maintain the mixture at gentle reflux temperature. The reaction is preferably conducted at atmospheric pressure but if temperatures above normal boiling temperatures are required, superatmospheric pressures should be employed in order to maintain the liquid phase.

The formed resin is then treated to remove the salt formed during the reaction. The salt is preferably removed by the use of solvents which may be added at the beginning of the process or during the working up of the resin. The more preferred method is to use the solvent during the purification of the formed resin. Solvents used for this purpose may be any solvent which is relatively immiscible with brine solution and dissolves but does not react with the resin. Examples of these solvents include, among others, methyl isobutyl ketone, toluene, diisobutyl ketone, benzene, ethylbenzene and the like, and mixtures thereof.

In working up the resin, the solvent may be added before or after the removal of the aqueous mother liquor phase, but is preferably added after the removal of the aqueous mother liquor phase. The amount of solvent added should be sufficient to form a mobile organic liquid phase with the resin and in most cases the solvent and resin are preferably utilized so as to form solutions having a resin content of about 20% to 80%.

After the resin has been taken up in the solvent, the organic phase is then water washed to remove any entrained salt. One washing may be sufficient, but it is usually desirable to employ two or more washings to ensure satisfactory removal of the salt. It may also be desirable to add agents such as acetic acid or sodium di- or monohydrogen phosphate to the water to neutralize any unreacted hydroxide.

After the addition of the water wash, the mixture is then merely allowed to stand for a short time until the two distinct layers are formed. The water phase is then discarded and the organic phase treated to remove the solvent and any entrained water. This may be accomplished by distillation or other suitable means. If distillation is utilized, care must be exercised not to remove any monomeric glycidyl ethers which may be present in the reaction mixture due to the reaction of the monohydric phenol with the epichlorohydrin. This can be done by controlling the kettle temperature or by the use of partial condensers.

The composition containing the glycidyl ethers of the polyhydric phenols as formed by the present invention may be utilized for many applications. As noted above, their low viscosities make them particularly suited for use in preparing adhesives, laminated articles and in the preparation of pottings and castings.

To illustrate the manner in which the invention may be carried out, the following examples are given. It is to be understood, however, that the examples are for the purpose of illustration and the invention is not to be regarded as limited to any of the specific compounds or conditions recited therein. Unless otherwise specified, parts disclosed in the examples are parts by weight.

*Example 1*

1 mol of bis-phenol was dissolved in 10 mols of epichlorohydrin and 1 to 2% water added to the resulting mixture. 5% by weight phenol was added to the mixture. The combined mixture was then placed in a kettle provided with heating and cooling means, agitator, distillation condenser and receiver. The mixture was brought to 80° C. and 2 mols of solid sodium hydroxide added in small portions. Sufficient cooling is applied during the addition so that the temperature is maintained at about 95–97° C. and there is a gentle distillation of epichlorohydrin and water. After the last addition of sodium hydroxide with the completion of the reaction, the excess epichlorohydrin is removed by vacuum distillation. After completion of the distillation, the residue is cooled to about 90° C. and about 300 parts of benzene added. Cooling drops the temperature of the mixture to about 40° C. with precipitation of salt from the solution. The salt is removed by filtration and the removed salt carefully washed with about an additional 300 parts of benzene to remove polyether therefrom. The two benzene solutions were combined and distilled to separate the benzene. When the kettle temperature reaches 125° C., vacuum is applied and distillation. The resulting product is a liquid composition containing glycidyl polyether of bis-phenol having the following properties: Epoxy value of 0.541 eq./100 g., color 6 (Gardner), chlorine (percent w.) 0.24, viscosity 70 poises.

A plain glycidyl polyether of bis-phenol prepared in the same manner as above without the addition of the monohydric phenol had a viscosity of 150 poises at 25° C. (epoxy value 0.50 eq./100 g.).

The difference in properties between the product produced above and the product obtained by adding phenyl glycidyl ether as a diluent to the plain glycidyl polyether of bis-phenol prepared as shown in the preceding paragraph is shown by the following: An adhesive composition was prepared by mixing 100 parts of the composition of the invention prepared as in the first paragraph of Example I above, asbestos filling and 8 parts of diethylaminopropylamine. This mixture was placed between two sheets of aluminum and the bond cured at 100° C. The resulting bond had a tensile shear strength of 3890 p.s.i. at 180° F. (U.S.A.F. MILL a 8331). A similar bond prepared from a composition containing only the plain preformed glycidyl ether of bis-phenol as shown above plus an added 5% of phenyl glycidyl ether had a tensile shear strength at 180° F. of only 2490 p.s.i. A bond prepared from the plain preformed glycidyl ether of bis-phenol as shown above without addition of the phenyl glycidyl ether had a tensile shear strength of 3615 p.s.i. at 180° F.

100 parts of the composition of the invention produced in the first paragraph above was heated with 10 parts of 2-ethylhexoate salt of 2,4,6-tris(dimethylaminomethyl)-phenol at 65° C. for 2 hours. The resulting casting had a Barcol hardness of 34. A similar casting prepared from the plain glycidyl ether of bis-phenol prepared without the monohydric phenol also had a Barcol hardness of 34. Both castings displayed good flexibility and resistance to cold shock.

Example II

The preparation in the first paragraph of Example I was repeated with the exception that the amount of phenol added was 1% instead of 5%. The resulting product was a liquid composition having a viscosity of about 120 poises at 25° C. Gardner color of 4–5, 0.25% chlorine and weight per epoxy of 189. A casting prepared by heating 100 parts of the composition with 10 parts of the 2-ethylhexoate salt of 2,4,6-tris(dimethyl-aminomethyl)phenol as in Example I had a Barcol hardness of 34. An adhesive composition prepared from the above-noted composition and bonded to aluminum as in Example I also displayed excellent strength at elevated temperatures.

Example III

The preparation in the first paragraph of Example I was repeated with the exception that the amount of phenol added was 13% instead of 5%. The resulting product was a liquid composition having a viscosity of about 27 poises at 25° C., Gardner color of 3–4, 0.25% chlorine and weight per epoxy of 186. A casting prepared by heating 100 parts of the composition with 10 parts of the 2-ethylhexoate salt of 2,4,6-tris(dimethyl-aminomethyl)phenol as in Example I had a Barcol hardness of 35. An adhesive composition prepared from the above-noted composition and bonded to aluminum as in Example I also displayed excellent strength at elevated temperatures.

Example IV

The preparation in the first paragraph of Example I was repeated with the exception that the amount of phenol added was 8.7% instead of 5%. The resulting product was a liquid composition having a viscosity of about 46 poises at 25° C. Gardner color of 4, 0.26% chlorine and weight per epoxy of 187. A casting prepared by heating 100 parts of the composition with 10 parts of 2-ethylhexoate salt of 2,4,6-tris(dimethylamino-methyl)phenol as in Example I had a Barcol hardness of 35. An adhesive composition prepared from the above-noted composition and bonded to aluminum as in Example I also displayed excellent strength at elevated temperatures.

Example V

Compositions having related properties are obtained by replacing the monohydric phenol in Examples I to IV with equal amounts of each of the following: p-tert-butylphenol, 3,5-dimethylphenol and p-octylphenol.

Example VI

The preparation in the first paragraph of Example I was repeated with the exception that the amount of phenol added was 3.1%. The resulting product was a liquid composition having a viscosity of 84 poises at 25° C. A casting prepared by heating 100 parts of the composition with an equivalent amount of hexahydro-phthalic anhydride was very hard and had good solvent resistance.

We claim as our invention:

1. A process for the production of glycidyl ether of 2,2-bis(4-hydroxyphenyl)propane which comprises mixing about 1.8 to 2.5 moles of sodium hydroxide with a solution containing a mole of the phenol, about 5 to 25 moles of epichlorohydrin and about 3 to 10% by weight of the 2,2-bis(4-hydroxyphenyl)propane of a monohydric phenol, the mixture being heated and agitated in liquid phase at about 40 to 150° C., and recovering the glycidyl ether from the reaction mixture.

2. A process as in claim 1 wherein the monohydric phenol is an alkylated monohydric phenol.

3. A process as in claim 1 wherein the 2,2-bis(4-hydroxyphenyl)propane and epichlorohydrin are utilized in a ratio of 1:5 to 1:10.

4. A process for production of glycidyl ether of a dihydric phenol which comprises mixing and reacting a mole of an unsubstituted dihydric phenol containing no more than 30 carbon atoms with an alkali metal hydroxide and from 2 to 25 moles of epichlorohydrin in the presence of from 0.1% to 13% by weight of the dihydric phenol of a monohydric phenol, and recovering the formed glycidyl ether from the reaction mixture.

References Cited in the file of this patent

UNITED STATES PATENTS 2,456,408    Greenlee _____ Dec. 14, 1948